United States Patent [19]

Hippenmeyer

[11] Patent Number: 4,707,250

[45] Date of Patent: Nov. 17, 1987

[54] MACHINE WITH AUTOMATIC TRANSPORT OF ARTICLES

[75] Inventor: Heinrich Hippenmeyer, Freiamt, Fed. Rep. of Germany

[73] Assignee: Erwin Sick GmbH Optik-Elektronik, Waldkirch, Fed. Rep. of Germany

[21] Appl. No.: 747,287

[22] Filed: Jun. 21, 1985

[30] Foreign Application Priority Data

Jun. 26, 1984 [DE] Fed. Rep. of Germany ....... 3423538

[51] Int. Cl.$^4$ ............................................ B07C 5/342
[52] U.S. Cl. ..................................... 209/548; 209/565; 377/54; 414/135; 198/356
[58] Field of Search ............... 209/548, 559, 546, 549, 209/550, 552, 562–566, 576, 577, 587, 939, 912; 377/54; 198/356; 414/135, 136

[56] References Cited

U.S. PATENT DOCUMENTS

| | | | |
|---|---|---|---|
| 3,097,743 | 7/1963 | Scholten et al. ..................... | 209/565 |
| 3,743,090 | 7/1973 | Brown et al. ..................... | 198/356 X |
| 3,749,993 | 7/1973 | Laman ............................. | 209/548 X |
| 4,047,613 | 9/1977 | Wright ............................. | 209/566 X |
| 4,266,674 | 5/1981 | Bell et al. ......................... | 209/546 X |
| 4,386,708 | 6/1983 | Sieverin ........................... | 209/566 X |

FOREIGN PATENT DOCUMENTS 57-112243 7/1982 Japan ................................. 414/135

Primary Examiner—Robert B. Reeves
Assistant Examiner—Glenn B. Foster

[57] ABSTRACT

In a machine having automatic article transport individual identical articles are conveyed along a conveyor path (21) past various processing stations. A clock (12) is associated with the conveyor path. Furthermore, a characteristic detection apparatus (13) is provided which delivers information corresponding to the characteristics of the articles (16) which are moving past to a characteristic shift register (11), which is pulsed by the clock (1). An article sorting apparatus (14) is arranged spaced from the characteristic detection apparatus and is controlled by the associated storage (11') of the characteristic shift register. A further presence shift register (15) is arranged parallel to the characteristic shift register (11) and the information contained in the presence shift register (15) is compared with the output of a presence detection apparatus (17) and can be used to stop the machine in the event that a deviation is detected. (FIG. 1).

3 Claims, 1 Drawing Figure

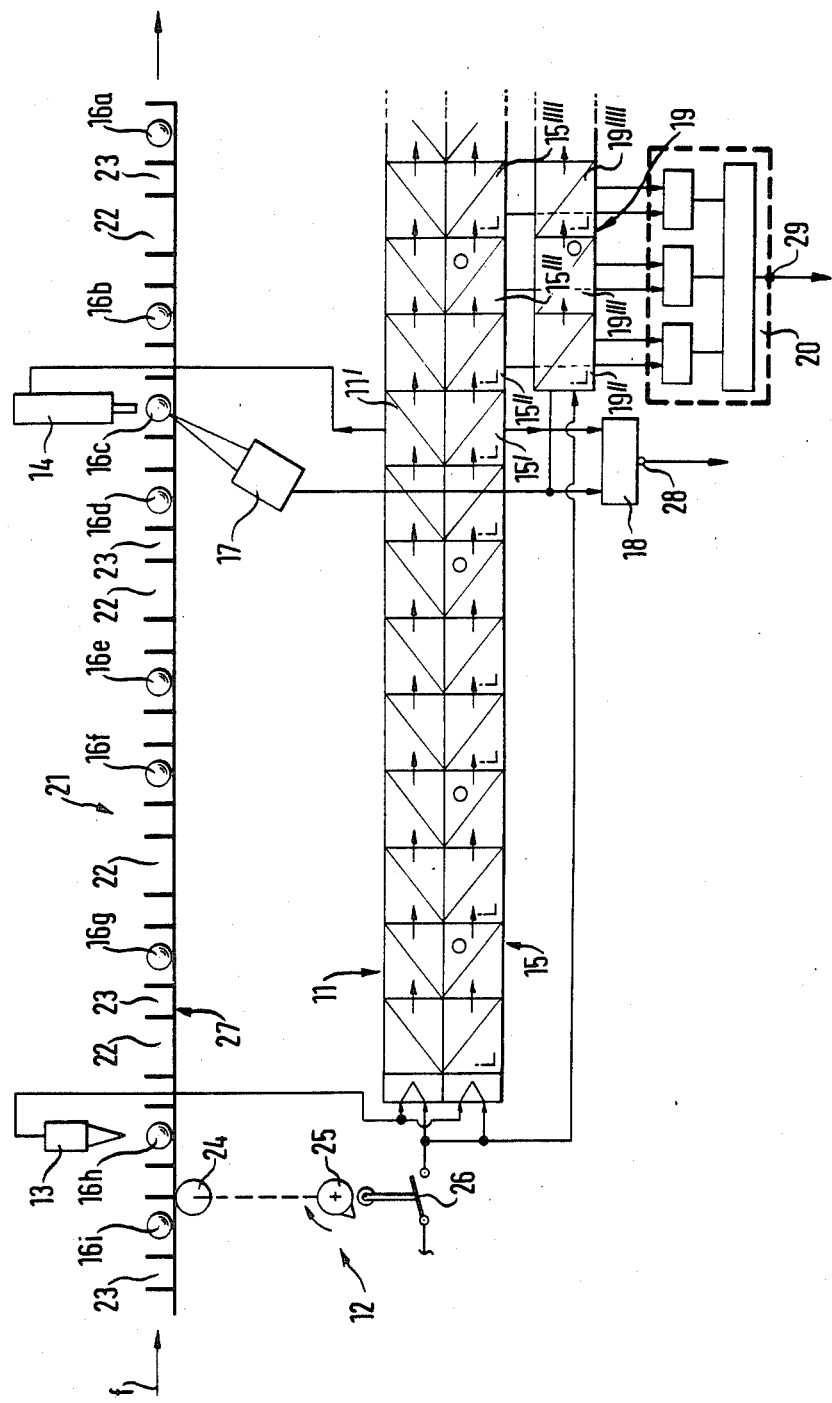

MACHINE WITH AUTOMATIC TRANSPORT OF ARTICLES

The present invention relates to a machine having automatic article transport, in particular a packaging machine, wherein individual like articles are moved along a conveyor path on a conveyor subdivided into unit lengths, which are each associated with one article, at a defined distance from each other past various processing stations.

In one known arrangement the machine comprises a clock which transmits a clock signal to a characteristic shift register associated with the conveyor path on advance of the conveyor by one unit length, and thereby shifts the information contained in the characteristic shift register on by one storage unit. A characteristic detection apparatus which is provided in the vicinity of the start of the conveyor path and which is connected to the input of the characteristic shift register, detects characteristics of the articles moving past which differ from the norm and transmits a corresponding electrical characteristic signal which is subsequently written into the characteristic shift register. An article sorting apparatus which is arranged at a later position of the conveyor path and which is connected to the characteristic shift register receives, at the instant an article moves past, the associated characteristic signal from the associated storage unit of the characteristic shift register and correspondingly sorts in the relevant article.

In such machines with automatic article transport, and in particular automatic workpiece transport, such as is found in packaging machines, the information which accompanies the individual article (for example information formed at a control station as to whether the article is good or poor) is passed on in an electrical characteristic shift register in parallel to the physical transport of the article in the same rhythm as the article itself. A characteristic shift register of this kind is able to retransmit the stored information at any desired position, i.e. after any desired number of cycles or shifting steps, for example in order to bring about further processing steps such as sorting at subsequent processing stations. The term sorting is to be understood here in the broadest sense, i.e. that the article sorting apparatus may for example eject the article as unusable, or mark it as faulty in a suitable manner.

The decisive factor as to whether the associated information from the characteristic shift register is associated with the transported article at the apropriate station is the length of the shift register which is used which can in general be freely programmed. If this length in working cycles does not correspond to the corresponding distance moved by the article along the conveyor path, then the information stored in the shift register will be associated with the incorrect article.

Such faults in the association of article and characteristic signal in the vicinity of the article sorting apparatus can also arise when an article is present at the boundary between two unit length as a result of non-precise synchronisation of the conveyor with the clock, resulting in the next signal of the characteristic shift register being issued rather than the signal corresponding to the article. It is also possible that articles are removed in unauthorised manner from the conveyor path, or that they fall from the conveyor path between the characteristic detection apparatus and the article sorting apparatus. The danger of loss of synchronisation between the article transport and the transport of the characteristic information is particularly large when the conveyor path includes more or less large loops between the characteristic detection apparatus and the article sorting apparatus.

The object underlying the present invention is thus to provide a machine of the initially named kind with automatic article transport in which any faulty displacements between the transport of the articles on the conveyor path and the transport of the characteristic information in the characteristic shift register can be automatically detected.

In order to solve this problem the invention provides that a second presence shift register, which is likewise controlled by the clock is provided in parallel with the characteristic shift register; that a presence signal is written into the second presence shift register in the presence of an article moving past the characteristic detection apparatus; and that an article presence detection apparatus is arranged at the location of the article sorting apparatus and is connected, in the same way as the associated storage unit of the presence shift register, to a logic circuit which transmits a fault signal when the determination made by the presence detection apparatus differs from the content of the associated storage unit of the presence shift register.

In this manner an automatic control takes place in the region of the article sorting apparatus as to whether a corresponding presence or lack of presence signal, corresponding to the presence or lack of presence of an articles at this location, is stored in the additional presence shift register. Should a deviation be detected here then a fault signal is transmitted which indicates to the operator that the passing on of the information has moved out of phase with the transport. Preferably however a machine stop signal is transmitted by the logic circuit which prevents the faulty sorting which is to be expected as a result of the loss of phase/synchronisation.

Although a separate presence sensor could be provided in the vicinity of the characteristic detection apparatus it is preferable for the presence signal for the presence shift register to be likewise derived from the characteristic detection apparatus. In this way the same apparatus can be used to feed both shift registers.

The logic circuit is expediently an EXCLUSIVE-OR circuit.

An advantageous further development of the invention is characterised in that the output signal of the presence detection apparatus is applied to the input of a third comparison shift register which is likewise switched on (shifted) in synchrony with the conveyor; and in that one or preferably more storage units, which are associated with one another, of the presence shift register and of the comparison shift register are applied to a comparison circuit which checks the contents of these two regions of the presence shift register and of the comparison shift register for coincidence and transmits an error signal if coincidence is not present. This provides even better reliability because the contents of two special presence shift registers are compared and conclusions can be drawn from the comparison regarding faulty information transport. A comparison of this kind also makes it possible to conclude whether the pieces of information in the presence and characteristic shift registers have all been displaced by one or more storage units, for example by a systematic error. If this is the case then a correction can be effected simply, for example also automatically, by appropriately advancing or retarding the shift register. In each case the lack of coincidence of the two additional shift registers should be indicated to the operator.

It is also particularly advantageous if, on detecting a displacement of all the presence signals in the comparison shift register by one storage unit relative to the presence shift register, the entire content of the presence shift register is correspondingly automatically advanced or retarded by one storage unit.

In order to avoid the disadvantageous effects of a loss of synchronisation between the article transport and the information transport provision is preferably made, in accordance with the invention, that a machine stop signal is formed on deviation of the output signal of the presence detection apparatus from the content of the associated storage unit of the presence shift register, and/or on lack of coincidence and/or on non-producable coincidence between the presence shift register and the comparison shift register.

The invention will now be described in the following by way of example only and with reference to the drawing, the single figure of which shows a schematic representation of a machine in accordance with the invention having automatic article transport.

As seen in the drawing individual compartments 22 are provided along a conveyor path 21. Free spaces 23 which all have the same dimensions in the conveying direction can be present between the compartments in the conveying direction. The compartments 22 also have the same dimensions in the conveying direction. The length of a compartment 22 and of an adjoining free space 23 in the conveying direction is termed the unit length for the conveyor path 21.

Articles 16a, 16b, 16c, 16d, 16e, 16f, 16g, 16h and 16i, which are schematically illustrated as balls, are arranged in some of the compartments 22. Some of the compartments 22 are however empty. This arises because the conveyor assumed to exist for the present embodiment may have a substantially higher conveying speed than a preceding machine from which the articles 16 are delivered. This results purely statistically in an empty compartment 22 being present between some of the articles, for example 16f and 16g.

A clock 12 is located at the start of the conveyor path 21 and consists for example of a wheel driven synchronously with the conveyor belt, and of a cam wheel 25 connected to the wheel 24 which short circuits a switch 26 each time a unit length of the conveyor 27, consisting of a compartment 22 and the adjoining free space 23, has moved past.

A characteristic detection apparatus 13 is located directly behind the clock 12 in the conveying direction f at the conveyor path 21. The characteristic detection apparatus 13 can for example be a photoelectric sensor which considers the articles which move beneath it from above, as seen in the drawing the article 16h, and which applies, for example on detecting a fault, an electrical output signal to the information inputs of two similar shift registers which run in parallel, namely a characteristic shift register 11 and a presence shift register 15. The clock signal from the clock 12 present at the output of the switch 26 is applied to the control inputs of the two shift registers 11, 15.

An article sorting apparatus 14 is arranged spaced at a distance of for example eight unit lengths from the characteristic detection apparatus 13 and is connected to the eighth storage unit 11' of the charcteristic shift register 11. If a fault signal is written for example into the storage unit 11' then this signifies that the characteristic detection apparatus 13 has found a fault in the article 16c as this article moved past the characteristic detection apparatus 13. The consequence is now that the article sorting apparatus 14 ejects for example the article 16c as being faulty and thus removes it from undesired further processing or use.

The characteristic detection apparatus 13 simultaneously delivers a presence signal to the presence shift register 15 which is moved on pulsewise completely parallel and in synchronisation with the characteristic signal in the presence shift register 15. Thus a presence signal must also be located in the storage unit 15' when the article 16c moves past the article sorting apparatus 14.

In order to control whether this is actually the case a presence detection apparatus 17 is located at the position of the article sorting apparatus 14 and deduces, for example by photoelectric means, whether an article is present or not in a compartment which is currently located at the article sorting apparatus 14. If in the illustrated situation an article were erroneously not located in the compartment 22 then a corresponding determination would be made in a logic circuit 18 on which both the storage unit 15' and also the presence detection apparatus 17 act an a machine stop signal would for example be transmitted at the output 28. As a result of the described arrangement the machine can thus be automatically stopped in each case when the synchronisation is lost between the flow of articles along the conveyor path and the flow of information within the characteristic shift register 11. After stopping the machine the error can be detected, overcome and the machine restarted.

As seen in the drawing the presence detection apparatus 17 is not only connected to the logic circuit 18, which is preferably constructed as an EXCLUSIVE-OR circuit, but also to the information input of a further comparison shift register 19, the control input of which is likewise connected to the clock 12. In this manner the findings of the presence detection apparatus 17 are additionally written into the comparison shift register 19.

Various storage units of the comparison shift register 19, namely in the illustrated embodiment the storage units 19″, 19‴ and 19⁗ are connected to a comparison circuit 20 in the same way as the associated storage units 15″, 15‴ and 15⁗ respectively of the presence shift register 15 and the coincidence or non-coincidence of the corresponding storage units is detected in the comparison circuit 20. When no errors have occurred between the characteristic detection apparatus 13 and the presence detection apparatus 17, for example by falling out of an article, then the contents of the compared storage units of the presence shift register 5 and of the comparison shift register 19 must be identical. If however one article is incorrectly missing in the vicinity of the article sorting apparatus 14 then the storage contents no longer correspond which is indicated by a machine stop signal at the output 29 of the comparison circuit 20.

The advantage of the additional comparison shift register 19 lies in the fact that it can also detect displacements of one storage unit in each case which points to a systematic error which can be corrected by correspondingly advancing or retarding the shift register 11, 15.

Thus, the information associated with the article should be given out again from the characteristic shift register at the article sorting apparatus 14, and this can be achieved by appropriate programming. The monitoring of the adjustment of the shift register takes place in accordance with the invention in that the sequence of the articles moving past the position of the article sorting apparatus 14 is detected by the presence detecting apparatus 17. Conclusions can be drawn relating to the incorrect adjustment of the length of the shift register from the comparison between the output signals of the storage unit 15' and of the presence detection apparatus 17. This incorrect adjustment can then be corrected after the corresponding determination.

In will be appreciated that modifications can be made to the above system without departing from the scope of the present invention.

For example, it is contemplated that the presence shift register and the characteristic shift register may be incorporated into a single shift register. In this case the shift register would have a plurality of storage units associated with each unit length of the conveyor. The clock which transmits clock signals related to the advance of the conveyor would then be adapted to shift the shift register on by the relevant number of storage units each time the conveyor advances by one unit length. Thus, assuming there are two storage units associated with each unit length of the conveyor the first storage unit could contain a single bit of information specifying whether the article present is sound or faulty and the second storage unit can contain a single bit of information indicating whether or not an article is present. At the article sorting station it is then only necessary to ensure that the information contained in the storage units of the shift register is correctly associated with the piece of apparatus for which it is intended. A system of this kind is for example claimed in independent claim 7. It will be appreciated that the first article presence detection apparatus can be integrated without problems into the characteristic detection apparatus. Furthermore, it will be appreciated that the first and second article presence detection apparatuses do not of necessity have to be located at the characteristic detection apparatus and at the sorting apparatus respectively. It is sufficient if the first and second article presence detection apparatuses are located relatively close to the respective ones of the characteristic detection apparatus and the article sorting apparatus that loss of articles from the conveyor need not be feared as the conveyor moves between the characteristic detection apparatus and the first article presence detection apparatus on the one hand and between the sorting apparatus and the second article presence detection apparatus and the article sorting apparatus on the other hand.

The above described embodiment recognises that the shift register system can effectively operate in time multiplex or in space multiplex.

We claim:

1. An automatic article transport machine, in particular a packaging machine, wherein individual like compartments are moved on a conveyor along a conveyor path subdivided into unit lengths, which are each associated with one compartment, past various processing stations, a certain article being present in some compartments, said article having one of two characteristics, either a characteristic corresponding to a certain norm or a characteristic differing from the certain norm, whereas some other compartments are empty; said machine comprising: a clock associated with the conveyor which transmits a clock signal to a characteristic shift register associated with the conveyor path on advance of the conveyor by one unit length, and thereby shifts the information contained in the characteristic shift register on by one storage unit; a characteristic detection apparatus which is provided in the vicinity of the start of the conveyor path, said apparatus being connected to the input of the characteristic shift register and detects that one of said two characteristics of each article which the article moving past said apparatus possesses, and transmits a corresponding electrical characteristic signal which is input into the storage unit of the characteristic shift register being associated with said article; and an article sorting apparatus arranged at a downstream position of the conveyor path, the article sorting apparatus being connected to the characteristic shift register and, at the instant an article moves past, receives the associated characteristic signal from the associated storage unit of the characteristic shift register and correspondingly sorts the relevant article; a presence shift register, controlled by the clock, being provided in parallel with the characteristic shift register and has one storage unit for each compartment; a presence signal being input into the associated storage unit of the presence shift register in the presence of an article moving past the characteristic detection apparatus whereas an absence signal is input into said storage unit if the compartment is empty; and an article presence detection apparatus arranged along the conveyor path at the location of the article sorting apparatus and connected to a logic circuit which transmits a fault signal when the determination made by the presence detection apparatus differs from the content of the associated storage unit of the presence shift register, the output signal of the presence detection apparatus being applied to the input of a comparison shift register which is shifted in synchronism with the conveyor; at least one of a plurality of storage units associated with one another, of the presence shift register and of the comparison shift register being applied to a comparison circuit which checks the contents of said at least one storage unit of the presence shift register and of the comparison shift register for coincidence and transmits an error signal if coincidence fails to be present.

2. A machine according to claim 1, wherein on detecting a displacement of all presence signals in the comparison shift register by one storage unit relative to the presence shift register the entire content of the presence shift register is automatically advanced or retarded by one storage unit.

3. A machine according to claim 1, wherein a machine stop signal is output by said comparison shift register upon occurrence of at least one of the following: deviation of the output signal of the presence detection apparatus from the content of the associated storage unit of the presence shift register, lack of coincidence, non-producable coincidence between the presence shift register and the comparison shift register.

* * * * *